United States Patent
Lasagni

(10) Patent No.: US 10,158,239 B2
(45) Date of Patent: Dec. 18, 2018

(54) POWER SUPPLY STAGE OF AN ELECTRIC APPLIANCE, IN PARTICULAR A BATTERY CHARGER FOR CHARGING BATTERIES OF ELECTRIC VEHICLES

(71) Applicant: Meta System S.p.A., Reggio Emilia (IT)

(72) Inventor: Cesare Lasagni, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 0 days.

(21) Appl. No.: 15/127,031

(22) PCT Filed: Mar. 3, 2015

(86) PCT No.: PCT/IT2015/000055
§ 371 (c)(1),
(2) Date: Sep. 19, 2016

(87) PCT Pub. No.: WO2015/140825
PCT Pub. Date: Sep. 24, 2015

(65) Prior Publication Data
US 2018/0054071 A1  Feb. 22, 2018

(30) Foreign Application Priority Data
Mar. 17, 2014 (IT) .............. MO2014A0070

(51) Int. Cl.
*H02J 7/00* (2006.01)
*B60L 11/00* (2006.01)
(Continued)

(52) U.S. Cl.
CPC ......... *H02J 7/0029* (2013.01); *B60L 11/1811* (2013.01); *H02H 3/20* (2013.01);
(Continued)

(58) Field of Classification Search
CPC .............. H02J 7/0052; H02J 7/0029; H02J 2007/0059; B60L 11/1811; H02M 1/32; H02M 1/4225; H02H 3/20
(Continued)

(56) References Cited

U.S. PATENT DOCUMENTS 5,180,963 A * 1/1993 El-Sharkawi ............. G05F 1/70
323/209
2010/0246218 A1* 9/2010 Decraemer ......... H02M 1/4225
363/37
(Continued)

FOREIGN PATENT DOCUMENTS

WO   WO 2015/140825   9/2015

OTHER PUBLICATIONS

International Search Report and the Written Opinion dated Jul. 3, 2015 From the International Searching Authority Re. Application No. PCT/IT2015/000055.

*Primary Examiner* — Phallaka Kik

(57) ABSTRACT

The power supply stage (A) of an electric appliance, in particular battery chargers for charging batteries of electric vehicles or the like, comprises a power factor correction circuit (PFC), and overvoltage protection means equipped with:
- a switch (SW1) connected in series with a smoothing capacitor (C) of the power factor correction circuit (PFC);
- a control circuit (VD1) of the input voltage of the power supply stage (A) operatively connected to the switch (SW1).

6 Claims, 3 Drawing Sheets

(51) Int. Cl.
  *H02M 1/32* (2007.01)
  *H02H 3/20* (2006.01)
  *H02J 5/00* (2016.01)
  *H02M 1/42* (2007.01)
  *H02J 7/02* (2016.01)
  *H02H 9/00* (2006.01)
  *H02H 9/04* (2006.01)
  *B60L 11/18* (2006.01)
  *H02H 7/18* (2006.01)

(52) U.S. Cl.
  CPC ............ *H02H 9/001* (2013.01); *H02H 9/041* (2013.01); *H02J 5/00* (2013.01); *H02J 7/0052* (2013.01); *H02J 7/02* (2013.01); *H02M 1/32* (2013.01); *H02M 1/4225* (2013.01); *H02H 7/18* (2013.01); *H02J 2007/0059* (2013.01); *Y02B 70/126* (2013.01); *Y02T 90/127* (2013.01)

(58) Field of Classification Search
  USPC ..................................... 320/109, 104, 136
  See application file for complete search history.

(56) References Cited

U.S. PATENT DOCUMENTS

| | | | | |
|---|---|---|---|---|
| 2011/0080144 A1* | 4/2011 | Hua | ............ | H02J 7/041 323/210 |
| 2011/0242861 A1* | 10/2011 | Ayukawa | ............ | H01L 23/3171 363/70 |
| 2011/0309682 A1* | 12/2011 | Chiba | ............ | H02M 1/34 307/75 |
| 2012/0014152 A1* | 1/2012 | Nakamura | ............ | H02M 1/4258 363/126 |
| 2012/0033451 A1* | 2/2012 | Usui | ............ | H02M 1/4258 363/21.02 |
| 2012/0057382 A1* | 3/2012 | Uno | ............ | H02M 1/4225 363/89 |
| 2012/0120696 A1* | 5/2012 | Nishijima | ............ | H02M 1/4208 363/126 |
| 2012/0218670 A1 | 8/2012 | Han | | |
| 2012/0235649 A1* | 9/2012 | Uno | ............ | H02M 1/4225 323/210 |
| 2012/0262132 A1 | 10/2012 | Park et al. | | |
| 2012/0307529 A1* | 12/2012 | Chiba | ............ | H02M 1/08 363/17 |
| 2012/0319501 A1* | 12/2012 | Luthi | ............ | H02M 1/36 307/109 |
| 2013/0016539 A1* | 1/2013 | Nishibori | ............ | H02M 1/4225 363/44 |
| 2013/0100707 A1* | 4/2013 | Hatakeyama | ............ | H02M 3/3376 363/17 |
| 2013/0147431 A1* | 6/2013 | Lim | ............ | H02J 7/022 320/109 |
| 2014/0146574 A1* | 5/2014 | Worek | ............ | H02M 3/3376 363/17 |
| 2015/0002035 A1* | 1/2015 | Schie | ............ | H01L 27/0817 315/200 R |
| 2015/0023067 A1* | 1/2015 | Terasawa | ............ | H02M 1/4225 363/21.12 |
| 2015/0102765 A1* | 4/2015 | Lee | ............ | H02M 1/34 320/107 |
| 2016/0036319 A1* | 2/2016 | Katsumata | ............ | H02M 1/14 363/126 |
| 2016/0172996 A1* | 6/2016 | Matsui | ............ | H02M 1/4233 363/89 |
| 2016/0197562 A1* | 7/2016 | Kondo | ............ | H02M 7/2176 363/126 |
| 2017/0327103 A1* | 11/2017 | Lim | ............ | B60W 20/13 |

\* cited by examiner

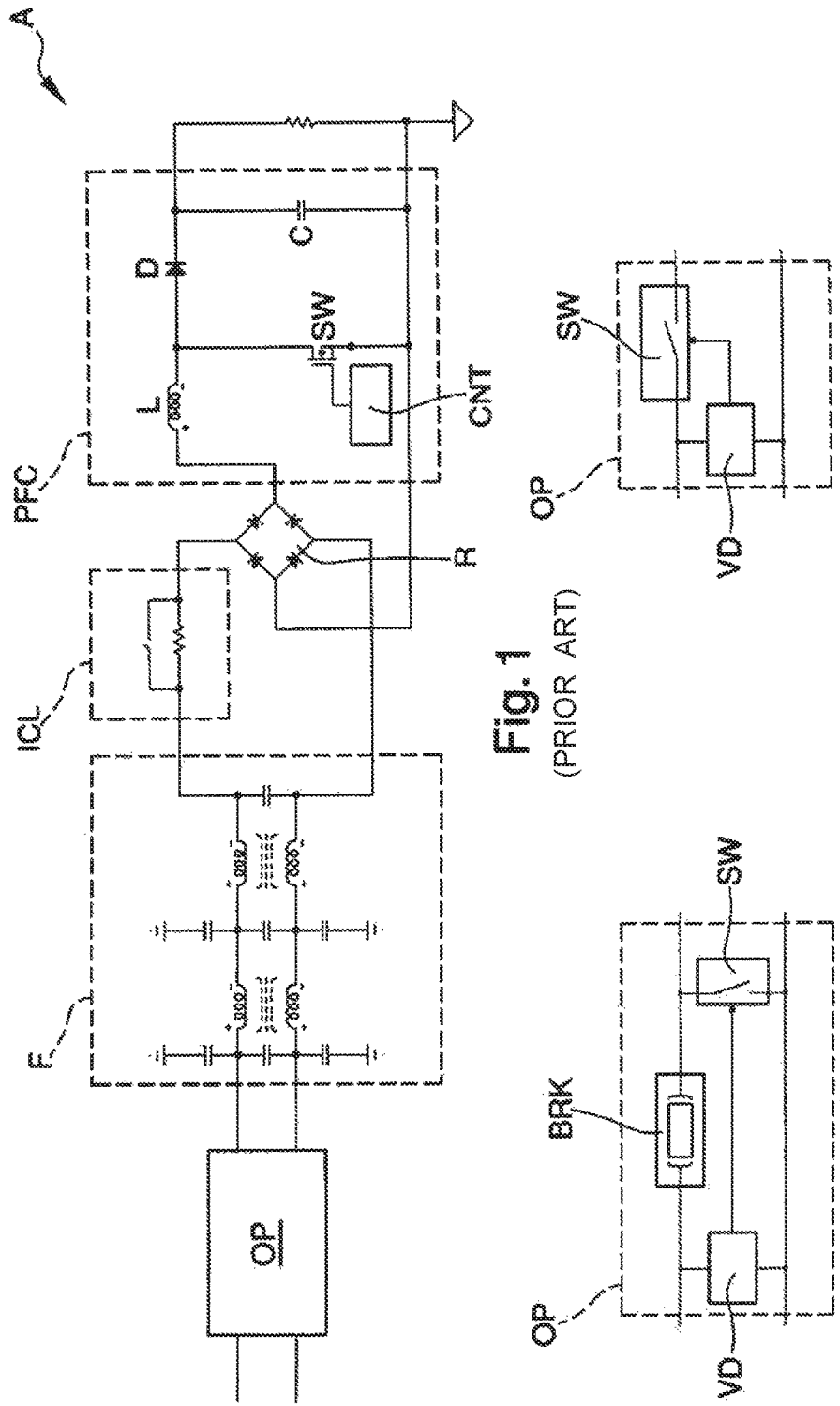

POWER SUPPLY STAGE OF AN ELECTRIC APPLIANCE, IN PARTICULAR A BATTERY CHARGER FOR CHARGING BATTERIES OF ELECTRIC VEHICLES

RELATED APPLICATIONS

This application is a National Phase of PCT Patent Application No. PCT/IT2015/000055 having International filing date of Mar. 3, 2015, which claims the benefit of priority of Italian Patent Application No. MO2014A000070 filed on Mar. 17, 2014. The contents of the above applications are all incorporated by reference as if fully set forth herein in their entirety.

FIELD AND BACKGROUND OF THE INVENTION

The present invention relates to a power supply stage of an electric appliance, usable in particular in battery chargers for charging batteries of electric vehicles.

The use is known and common of battery chargers generally integrated inside an electric vehicle, connectable at input to an alternate current power line and connected at output to an electric battery of the electric vehicle.

By way of example, a possible power supply stage A of a battery charger of known type is shown in FIG. 1 and comprises an input filter F, which can be connected to the external power supply line, an ignition current limiter ICL (or also "inrush current limiter"), a rectifier bridge R and a power factor correction circuit PFC.

In particular, in order to comply with the regulations on electrical disturbances, the purpose of the power factor correction circuit PFC is to enable a current to be picked up from the mains which is as sinusoidal as possible.

Always in order to comply with applicable regulations on electrical disturbances, a filter EMC is normally fitted upstream of the PFC itself. The PFC output is always a voltage higher than that of the mains, stabilized with respect to the latter, which is usually used for a further conversion stage.

It is further known that one of the most hazardous events in systems powered by three-phase voltage with neutral, in the event of the three voltages being used as single-phase voltages, is the loss of the neutral connection.

In this situation in fact, if absorptions are unbalanced a virtual star centre is created with potential different from zero.

It therefore follows that the starred voltages can also take on very high values with consequent danger for the integrity of the user devices.

In particular, in the single-phase electronic systems connected to a three-phase power supply, the loss of the neutral can result in the components at supply unit input undergoing voltages in excess of plate values. The simplest way of avoiding the destruction of the device is to monitor the input voltage and interrupt the line in case of overvoltage.

Such monitoring and interruption of the line are normally carried out by an overvoltage protection circuit OP fitted upstream of the filter F.

More specifically, two solutions are known and used.

A first known solution, schematically shown in FIG. 2, envisages the implementation of the (overvoltage) protection circuit OP by means of a switch SW in parallel, controlled by a voltage detector VD, and by an overcurrent breaker BRK arranged in series.

Consequently, following the detection of an overvoltage by means of the voltage detector VD the switch SW is operated and then closed, with consequent interruption of the line by means of the breaker BRK.

This solution, however, is not without drawbacks.

In fact, first of all the reaction speed must be high or in any case compatible with the degree of "withstanding" of the components undergoing the overvoltage. This inevitably calls for the use of a switch SW of the type of an electronic switch.

Furthermore, this solution necessarily requires manual intervention to reset the line and the overcurrent protection and this is not always possible nor "acceptable" to the end user, especially if the protection consists of a fuse and not a resettable thermal magnetic switch.

A second known solution, shown schematically in FIG. 3, envisages the implementation of the protection circuit OP by means of a switch SW in series controlled by a voltage detector VD.

Consequently, following the detection of an overvoltage by means of the voltage detector VD, the switch SW is operated and therefore opened, with consequent line interruption.

This solution too, however, is not without drawbacks.

In fact, in this case as well, a high reaction speed is required and therefore, the use is called for of a switch SW of the type of an electronic switch.

With reference to such second solution, furthermore, we have a high dissipation of the component switch SW which, for reasons of response speed, cannot be a simple relay but normally consists of a semi-conductor electronic switch.

SUMMARY OF THE INVENTION

The main aim of the present invention is to provide a power supply stage of an electric appliance, in particular a battery charger for charging batteries of electric vehicles, which ensures an effective overvoltage protection in an efficient manner and with affordable costs.

Another object of the present invention is to provide a power supply stage of an electric appliance, in particular a battery charger for charging batteries of electric vehicles, which allows to overcome the mentioned drawbacks of the prior art within the framework of a simple, rational, easy and effective to use solution.

The above mentioned objects are achieved by the present power supply stage of an electric appliance, in particular a battery charger for charging batteries of electric vehicles, according to the characteristics described in claim 1.

BRIEF DESCRIPTION OF THE SEVERAL VIEWS OF THE DRAWINGS

Other characteristics and advantages of the present invention will become better evident from the description of two preferred, but not exclusive embodiments of a power supply stage of an electric appliance, in particular a battery charger for charging batteries of electric vehicles, illustrated as an indicative, but not limitative example in the accompanying drawings in which:

FIG. 1 is a general diagram of a possible power supply stage of a battery charger of known type;

FIGS. 2 and 3 are general diagrams of possible implementations of an overvoltage protection circuit of a power supply stage of a battery charger of known type;

DESCRIPTION OF SPECIFIC EMBODIMENTS OF THE INVENTION

With particular reference to such figures, globally indicated with A is a power supply stage of an electric appliance, usable in particular as a power supply stage of a battery charger for charging batteries of electric vehicles.

The use of the power supply stage A for electronic devices and equipment of different kind cannot however be ruled out.

Figure 4:
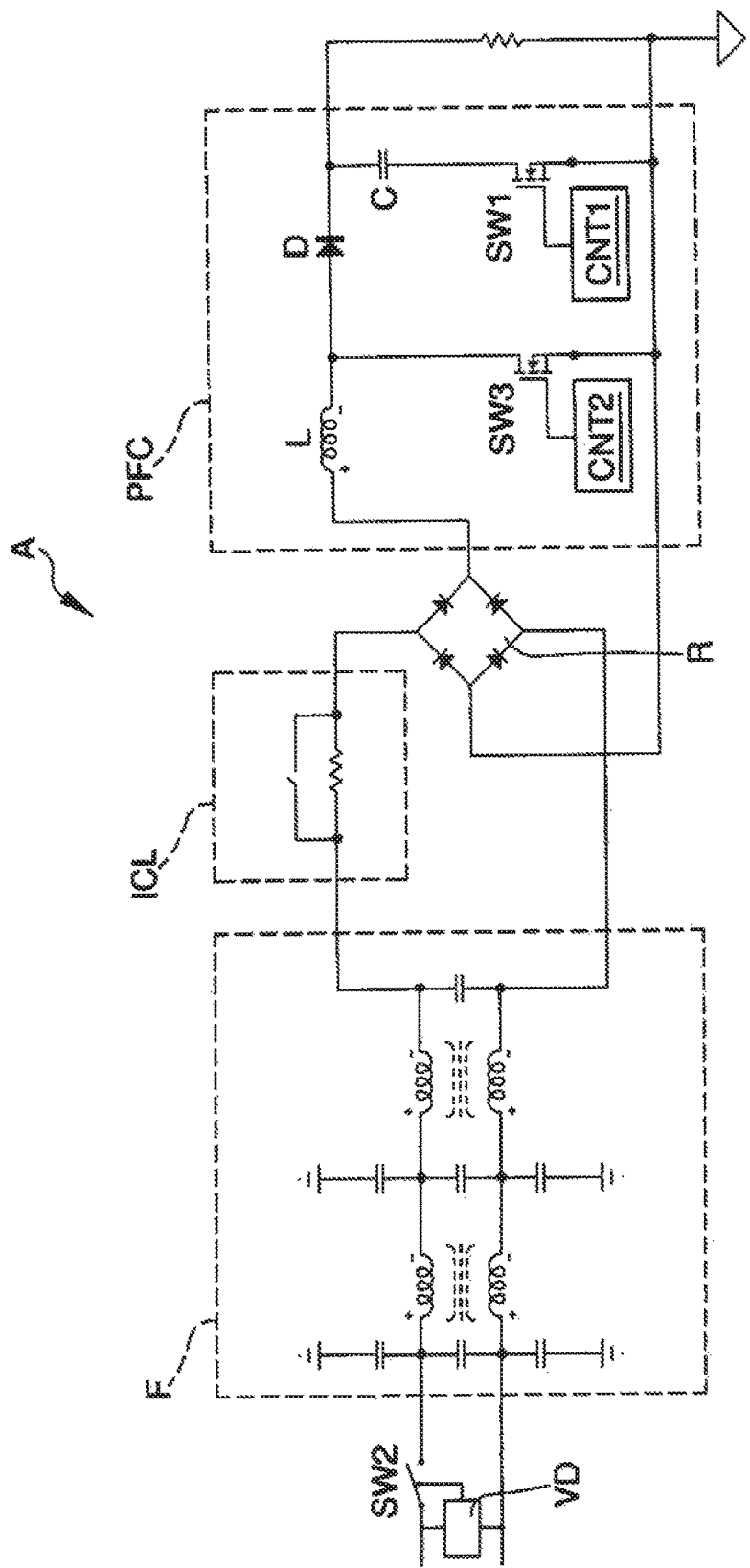
FIG. 4 is a general diagram that shows a possible first embodiment of the power supply stage according to the invention.

In particular, with reference to a first embodiment shown in FIG. 4, the power supply stage A comprises an input filter F connectable to an external power supply line, an ignition current limiter ICL connected downstream of the input filter F, a rectifier bridge R connected to the input filter F and to the ignition current limiter ICL, and a power factor correction circuit PFC connected downstream of the rectifier bridge R.

More specifically, the power factor correction circuit PFC comprises an input inductor L, at least a rectifying diode D and at least a smoothing capacitor C connected downstream of the rectifying diode D.

Advantageously, the power supply stage A comprises overvoltage protection means equipped with:
- a switch SW1, the type of an electronic switch, connected in series to a smoothing capacitor C of the power factor correction circuit PFC, downstream of the rectifying diode D;
- a control circuit CNT1 of the input voltage operatively connected to the electronic switch SW1 and able to operate, and therefore to open, the electronic switch SW1 in the event of an overvoltage at input being detected.

Consequently, the electronic switch SW1 and the control circuit CNT1 are implemented inside the power factor correction circuit PFC.

In practice therefore, the particular positioning of the electronic switch SW1 allows quickly protecting the capacitor C in case of overvoltages.

In fact, generally speaking the electrolytic smoothing capacitors downstream of the rectifying diode of the PFC are the first to undergo breakage in case of overvoltage. Currently, in fact, the work voltage for the single-phase systems is limited to 400-450 Vdc. Higher work voltages, sufficient to resist the overvoltages caused by lack of neutral, involve unacceptable sizes and costs of the capacitors and, therefore, of the power supply stage A itself.

Consequently, by means of a suitable control circuit CNT1 the input voltage can be monitored and any overvoltages can be determined very quickly.

The use of a switch of the electronic type, furthermore, permits having minimum response times sufficient to prevent faults affecting the capacitor C. It is not in fact possible to section the circuit with a relay because, in that case, the response time of an electromechanical device would be too high and would allow the voltage at the heads of the output electrolytic capacitor C to rise above acceptable limits.

In particular, the electronic switch SW1 used preferably consists of a field effect transistor of the type of a MOSFET or the like.

Always with reference to the first embodiment of the power supply stage A shown in FIG. 4, the overvoltage protection means also comprise an additional switch SW2, of the type of an electromechanical switch, arranged in series and upstream of the input filter F and connected to a suitable overvoltage detector VD.

Consequently, the electromechanical switch SW2 can be operated to protect all the component parts of the power supply stage A.

The operation of the power supply stage A, therefore, envisages that, in case of an overvoltage being detected, the control circuit CNT1 and the overvoltage detector VD trigger the electronic switch SW1 and the electromechanical switch SW2.

In particular, the rapid response times of the electronic switch SW1 permit quickly protecting the most sensitive components of the power supply stage A, more specifically the electrolytic capacitors C.

At the same time, the electronic switch SW1 is only in series to the electrolytic capacitor C and only dissipates the ripple current of the capacitor itself. Consequently, the electronic switch SW1 dissipates a very limited current and ensures a high efficiency of the entire circuit.

In the same way, albeit with slower response times, the electromechanical switch SW2 ensures the protection of the other components of the power supply stage A which are upstream of the power factor correction circuit PFC.

In fact, the input filter F necessarily consists of components able to withstand overvoltages inasmuch as such components must, according to standards, be oversized with respect to the applied voltages.

In practice, using components for voltage ratings of up to 300 Vac (those normally used in applications of a certain standard), these components can, for short periods, also undergo much higher voltages which, in the worst cases, can reach around 500 Vac (at maximum tolerance of +20% of the phase-to-phase three-phase voltage).

In the same way, the input rectifying bridge R is also normally able to withstand alternate voltages of up to 600 Vac, while the semi-conductors of the PFC circuit can be made using components with adequate voltage range, without this affecting dimensions and with zero or in any case very small cost increase. For example, the use of semi-conductors is currently common with breakdown voltage higher or equal to 650 volt.

Figure 5:
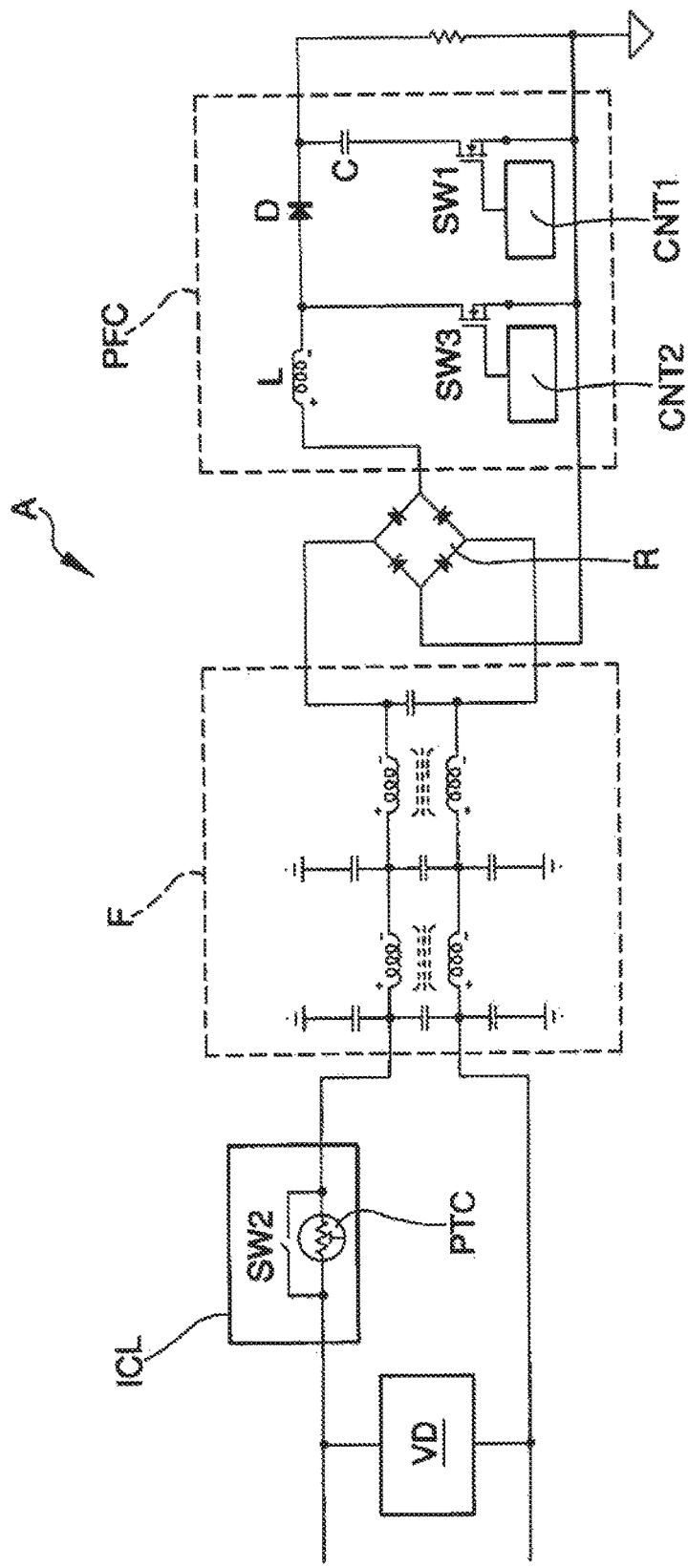
FIG. 5 is a general diagram that shows a possible second embodiment of the power supply stage according to the invention.

With reference to a second possible embodiment of the power supply stage A, shown in FIG. 5, alternatively to the electromechanical switch SW2 of the first embodiment, overvoltage protection means employ the same ignition current limiter ICL connected upstream of the power factor correction circuit PFC.

In particular, such ignition current limiter ICL comprises an electromechanical switch SW2 operatively connected to an overvoltage detector VD and connected in parallel to at least a positive temperature coefficient resistor PTC.

The power factor correction circuit PFC comprises a control switch SW3 connected to a respective control circuit CNT2.

In practice, once the overvoltage has been detected and SW1 has been immediately activated for the protection of the electrolytes, SW2 opens to prevent too much current passing in the PTC, and the control switch SW3 of the PFC circuit goes into short circuit. It is thus possible to raise the temperature of the resistor PTC so as to isolate the circuit or, in any case, so as to reduce to the utmost the current that crosses it.

Usefully, as shown in FIG. 5, the ignition current limiter ICL can be connected upstream of said input filter F.

Alternative embodiments cannot however be ruled out wherein, for example, the ignition current limiter ICL is connected upstream of the power factor correction circuit PFC but downstream of the input filter F.

It has in practice been observed how the described invention achieves the proposed objects.

In particular, the fact is underlined that the power supply stage according to the invention, usable in particular in battery chargers for charging the batteries of electric vehicles, ensures effective protection against overvoltages in an efficient manner and at affordable costs.

What is claimed is:

1. A power supply stage for charging batteries of electric vehicles, comprising:
    at least a power factor correction circuit;
    overvoltage protection circuit equipped with:
        at least a switch connected in series with at least a smoothing capacitor of said power factor correction circuit,
        at least an additional switch arranged in series and upstream of an input filter, and
        at least a control operatively connected to open said switch for dissipating a current of the smoothing capacitor when an overvoltage at input being detected and to operate said additional switch; and
    wherein at least said input filter is connectable to an external power line and connected upstream of said power factor correction circuit;
    wherein said switch is an electronic switch;
    wherein said additional switch is an electromechanical switch.

2. The power supply stage according to claim 1, wherein said overvoltage protection circuit comprises at least an ignition current limiter connected upstream of said power factor correction circuit.

3. The power supply stage according to claim 2, wherein said ignition current limiter comprises at least an electromechanical switch connected in parallel to at least a positive temperature coefficient resistor.

4. The power supply stage according to claim 2, wherein said ignition current limiter is connected upstream of said input filter.

5. The power supply stage according to claim 2, wherein said ignition current limiter is connected downstream of said input filter.

6. The power supply stage according to claim 1, wherein the switch is connected in series only with the smoothing capacitor.

* * * * *